(12) United States Patent
Kato et al.

(10) Patent No.: US 12,260,727 B2
(45) Date of Patent: Mar. 25, 2025

(54) PEDESTRIAN ATTENTION TRIGGER DEVICE, PEDESTRIAN ATTENTION TRIGGER SYSTEM, SERVER

(71) Applicant: TOYOTA JIDOSHA KABUSHIKI KAISHA, Toyota (JP)

(72) Inventors: Takahiro Kato, Numazu (JP); Takashi Kashimura, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/346,310

(22) Filed: Jul. 3, 2023

(65) Prior Publication Data
US 2024/0021060 A1 Jan. 18, 2024

(30) Foreign Application Priority Data
Jul. 15, 2022 (JP) .................. 2022-114402

(51) Int. Cl.
*G08B 23/00* (2006.01)
*G08B 6/00* (2006.01)
*G08B 21/02* (2006.01)

(52) U.S. Cl.
CPC .............. *G08B 21/02* (2013.01); *G08B 6/00* (2013.01)

(58) Field of Classification Search
CPC ...... G08B 21/02; G08B 6/00; G08B 21/0288; G08B 21/0269; G08B 21/028; G08B 21/0208; G08B 25/08; G08G 1/166; G08G 1/005; G08G 1/207; H04W 4/40; H04W 4/021

USPC .......................................................... 340/500
See application file for complete search history.

(56) References Cited

U.S. PATENT DOCUMENTS

| | | | | |
|---|---|---|---|---|
| 2011/0199199 A1* | 8/2011 | Perkins | .................. | B60Q 1/525 |
| | | | | 340/435 |
| 2011/0254703 A1* | 10/2011 | Li | .......................... | G08G 1/166 |
| | | | | 340/944 |
| 2020/0398743 A1* | 12/2020 | Huber | ............... | B60W 30/0956 |
| 2022/0051540 A1 | 2/2022 | Tanaka et al. | | |
| 2022/0392338 A1* | 12/2022 | Boysen | .................. | G08G 1/005 |

FOREIGN PATENT DOCUMENTS

| | | |
|---|---|---|
| JP | 2021-072043 A | 5/2021 |
| JP | 2022-032355 A | 2/2022 |
| WO | 2019240070 A1 | 12/2019 |

* cited by examiner

*Primary Examiner* — Tai T Nguyen
(74) *Attorney, Agent, or Firm* — Dinsmore & Shohl LLP

(57) ABSTRACT

A pedestrian attention trigger device includes a notification device capable of executing a first notification action when determined that a first condition satisfied, and capable of executing a second notification action when determined that a second condition different to the first condition is satisfied, and includes a processor. The processor controls the notification device to execute one action of the first notification action or the second notification action in priority over the other action thereof when the first condition and the second condition have both been satisfied at the same time, and to execute the other action when a condition that is one of the first condition or the second condition and that corresponds to the one action is no longer satisfied and also a condition that is the other of the first condition or the second condition and that corresponds to the other action is satisfied.

7 Claims, 11 Drawing Sheets

FIG.5

| DESIGNATED ZONE | ZONE CLASSIFICATION |
|---|---|
| THIRD ROAD | SAFETY CHECK ZONE |
| SECOND INTERSECTION | SAFETY CHECK ZONE |
| FIFTH ROAD | RETREAT ZONE |
| | |

PEDESTRIAN ATTENTION TRIGGER DEVICE, PEDESTRIAN ATTENTION TRIGGER SYSTEM, SERVER

CROSS-REFERENCE TO RELATED APPLICATION

This application is based on and claims priority under 35 USC 119 from Japanese Patent Application No. 2022-114402 filed on Jul. 15, 2022, the disclosure of which is incorporated by reference herein.

BACKGROUND

Technical Field

The present disclosure relates to a pedestrian attention trigger device, a pedestrian attention trigger system, and a server.

Related Art

A device disclosed in International Publication (WO) No. 2019/240070 executes a warning action when a specific condition has been satisfied while moving along a road with a child.

A telephone function may be added to the device of WO No. 2019/240070. In such cases there is room for improvement in relation to an action to notify a child of a warning action and an incoming call when there is an incoming telephone call to the device, from a separate communication terminal to the device, at the same time as the specific condition has been satisfied.

In consideration of the above circumstances, an object of the present disclosure is to obtain a pedestrian attention trigger device, a pedestrian attention trigger system, and a server capable of appropriately controlling a notification device when the notification device is in a state in which there are two executable notification actions at the same time.

SUMMARY

A pedestrian attention trigger device according to a first aspect is capable of moving with a user. The pedestrian attention trigger device includes a notification device and a processor. The notification device is capable of executing a first notification action when it has been determined that a first condition is satisfied. The first condition is satisfied when the user should adopt a safety related action. The notification device is capable of executing a second notification action when it has been determined that a second condition different from the first condition is satisfied. The processor controls the notification device so as to execute one action of the first notification action or the second notification action in priority over the other action of the first notification action or the second notification action when the first condition and the second condition have both been satisfied at the same time, and so as to execute the other action when a condition that is one out of the first condition or the second condition and that corresponds to the one action is no longer satisfied and also a condition that is the other of the first condition or the second condition and that corresponds to the other action is satisfied.

The pedestrian attention trigger device of the first aspect is capable of moving with a user. The processor controls the notification device capable of executing a first notification action when it has been determined that the first condition is satisfied, the first condition being satisfied when the user should adopt a safety related action. The notification device is capable of executing the second notification action when it has been determined that the second condition different from the first condition is satisfied. The processor also controls the notification device so as to execute the one action of the first notification action or the second notification action in priority over the other action when the first condition and the second condition have both been satisfied at the same time, and so as to execute the other action when the condition that is one out of the first condition or the second condition and that corresponds to the one action is no longer satisfied and also the condition that is the other out the first condition or the second condition and that corresponds to the other action is satisfied. The pedestrian attention trigger device of the first aspect is accordingly capable of appropriately controlling the notification device when the notification device is in a state in which there are two executable notification actions at the same time.

A pedestrian attention trigger device according to a second aspect is the first aspect, wherein the safety related action includes a safety check action, the first condition includes a safety condition satisfied when a distance from a zone where the user should execute the safety check action to the pedestrian attention trigger device is a first threshold or lower, and the processor controls the notification device so as to execute the first notification action in priority over the second notification action in cases in which the safety condition and the second condition have both been satisfied at the same time as each other.

The processor of the pedestrian attention trigger device of the second aspect controls the notification device so as to execute the first notification action in priority over the second notification action in cases in which the safety condition and the second condition have both been satisfied at the same time as each other. The user is accordingly prompted by the first notification action to execute the safety check action when both the safety condition and the second condition have been satisfied at the same time. There is accordingly only a small concern that due to the second notification action the user will no longer execute the safety check action.

A pedestrian attention trigger device according to a third aspect is the first aspect, wherein the second notification action includes at least one out of an action to notify arrival of an incoming telephone call, an action to notify receipt of a mail, an alarm action executed at a specific time, or a specific action of an application installed on the pedestrian attention trigger device.

In the third aspect, the notification device is able to execute as the second notification action at least one out of an action to notify arrival of an incoming telephone call, an action to notify receipt of a mail, an alarm action executed at a specific time, or a specific action of an application installed on the pedestrian attention trigger device.

A pedestrian attention trigger device according to a fourth aspect is the first aspect, wherein the safety related action includes a retreat action, the first condition includes a retreat condition satisfied when a distance from a zone where the user should execute the retreat action to the pedestrian attention trigger device is a second threshold or lower, the second notification action is a telephone incoming call action, and the processor controls the notification device such that the second notification action is executed in priority over the first notification action when the retreat condition and the second condition have both been satisfied at the same time as each other.

The processor of the pedestrian attention trigger device of the fourth aspect controls the notification device such that the second notification action is executed in priority over the first notification action when the retreat condition and the second condition have both been satisfied at the same time as each other. This thereby enables the user to recognize that there is an incoming call to the pedestrian attention trigger device. Moreover, anyone around the user will recognize this to be a situation in which the user is able to hold a voice call with someone through the pedestrian attention trigger device. The user is moreover prompted to execute the retreat action by the first notification action of the notification device.

A pedestrian attention trigger device according to a fifth aspect is the first aspect, wherein the safety related action includes a safety check action and a retreat action, and the first condition includes a safety condition satisfied when a distance from a zone where the user should execute the safety check action to the pedestrian attention trigger device is a first threshold or lower, and includes a retreat condition satisfied when a distance from a zone where the user should execute the retreat action to the pedestrian attention trigger device is a second threshold or lower. The first notification action includes a safety check notification action and a retreat notification action, wherein when the safety condition has been satisfied the first notification action is the safety check notification action, and when the retreat condition has been satisfied the first notification action is the retreat notification action.

In the fifth aspect, when the safety condition has been satisfied the notification device executes the safety check notification action, and when the retreat condition has been satisfied the notification device executes the retreat notification action. The user is thereby able to recognize which to execute from out of the safety check action or the retreat action.

A pedestrian attention trigger system according to a sixth aspect includes a server that wirelessly transmits information to determine whether or not the first condition and the second condition are satisfied to the pedestrian attention trigger device of the first aspect, and includes the pedestrian attention trigger device of the first aspect.

A server according to a seventh aspect is capable of wirelessly transmitting information to a pedestrian attention trigger device capable of moving with a user, and the server includes a processor. The pedestrian attention trigger device includes a notification device that is capable of executing a first notification action when it has been determined that a first condition satisfied. The first condition is satisfied when the user should adopt a safety related action is satisfied. The notification device is capable of executing a second notification action when it has been determined that a second condition different from the first condition is satisfied. The notification device is controlled so as to execute one action of the first notification action or the second notification action in priority over the other action of the first notification action or the second notification action when the first condition and the second condition have both been satisfied at the same time, and so as to execute the other action when a condition that is one of the first condition or the second condition and that corresponds to the one action is no longer satisfied and also a condition that is the other of the first condition or the second condition and that corresponds to the other action is satisfied. The processor is capable of wirelessly transmitting information to determine whether or not the first condition and the second condition are satisfied to the pedestrian attention trigger device.

As described above, the pedestrian attention trigger device, pedestrian attention trigger system, and server according to the present disclosure exhibit the excellent advantageous effect of being able to appropriately control a notification device when the notification device is in a state in which there are two executable notification actions at the same time.

BRIEF DESCRIPTION OF THE DRAWINGS

Exemplary embodiments of the present disclosure will be described in detail based on the following figures, wherein:

FIG. 5 is a diagram illustrating a designated zone list;

DETAILED DESCRIPTION

Description follows regarding an exemplary embodiment of a pedestrian attention trigger device, a pedestrian attention trigger system, and a server according to the present disclosure, with reference to the drawings.

Figure 1:
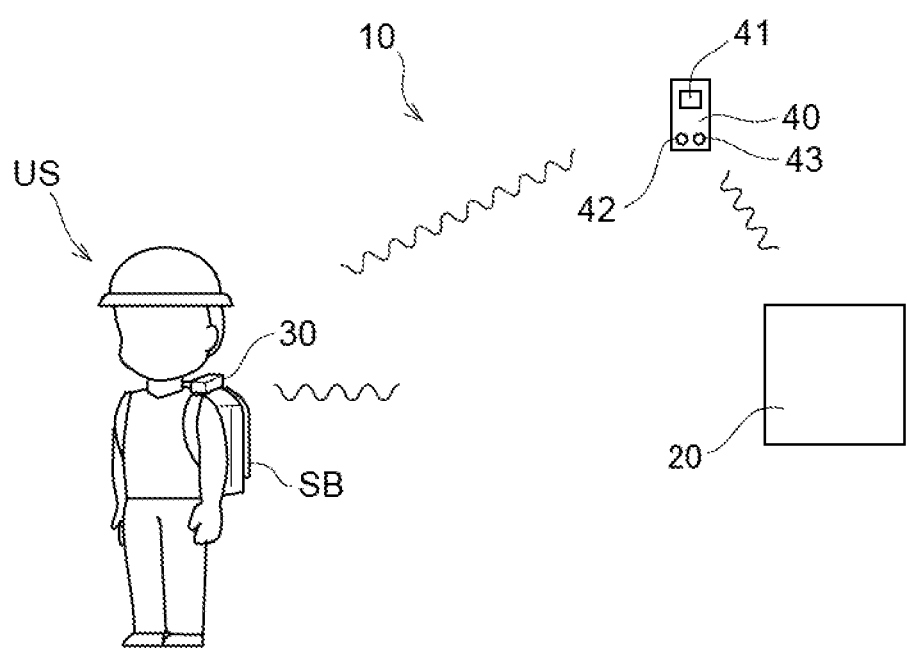
FIG. 1 is a diagram illustrating an overall configuration of a pedestrian attention trigger system including a pedestrian attention trigger device and a management server according to an exemplary embodiment.

As illustrated in FIG. 1, a pedestrian attention trigger system 10 of an exemplary embodiment (hereafter referred to as a system 10) includes a management server 20 (hereafter referred to as server 20), a pedestrian attention trigger device 30 (hereafter referred to as device 30), and a mobile terminal 40.

The server 20 is installed in a building (omitted in the drawings) owned by an administrator of the system 10.

Figure 3:
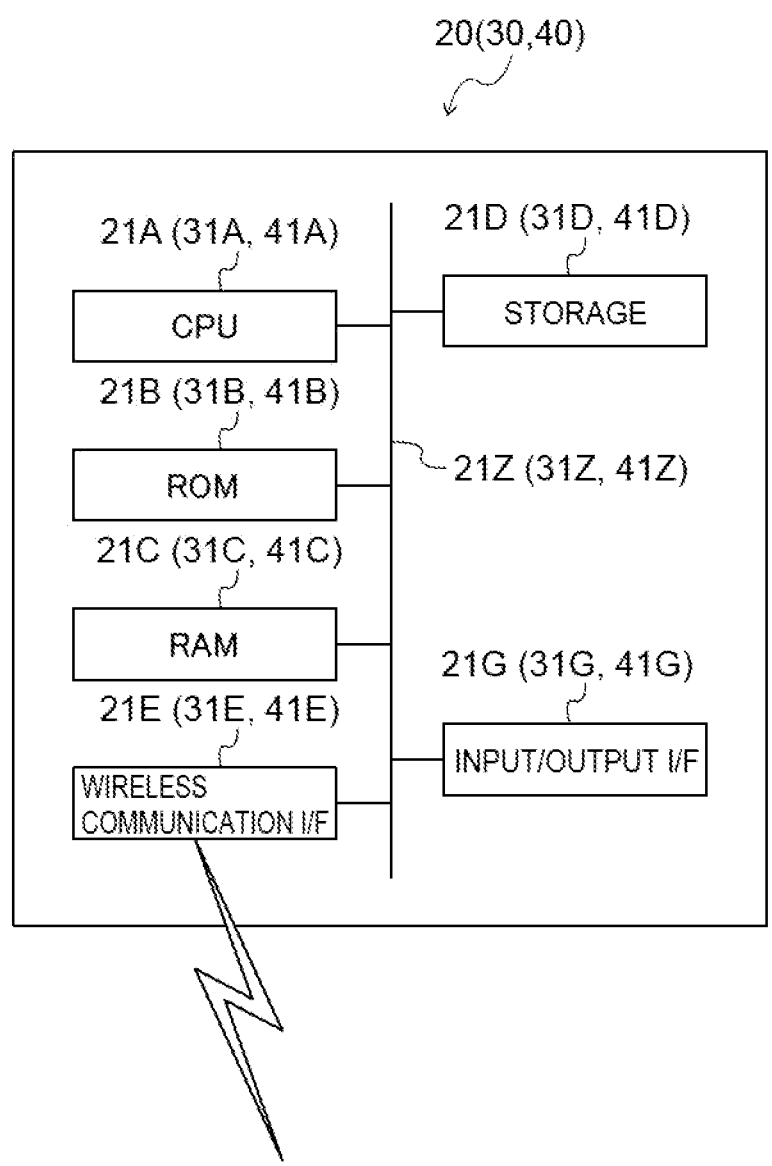
FIG. 3 is a control block diagram of a management server, pedestrian attention trigger device, and mobile terminal.

As illustrated in FIG. 3, the server 20 is configured including, as hardware configuration, a central processing unit (CPU) (processor) (computer) 21A, read only memory (ROM) (recording medium) (non-transitory recording medium) 21B, random access memory (RAM) 21C, storage 21D, a wireless communication interface (I/F) 21E, and an input/output I/F 21G. The CPU 21A, ROM 21B, RAM 21C, storage 21D, wireless communication I/F 21E, and input/output I/F 21G are connected together through an internal bus 21Z so as to be capable of communicating with each other. The CPU 21A and each other CPU, described later, are able to acquire information related to a timestamp from a timer.

The CPU 21A is a central processing unit that executes various programs and controls each section. The CPU 21A reads a program from the ROM 21B or the storage 21D, and executes the program using the RAM 21C as workspace. The CPU 21A controls each configuration section and performs various computational processing according to a program recorded on the ROM 21B or the storage 21D.

The ROM 21B is stored with various programs and various data. For example, plural programs are installed on the ROM 21B. For example, map data 22, a designated zone list 25, and information related to user ID, as described later, are recorded on the ROM 21B. The RAM 21C serves as a workspace temporarily storing programs or data. The storage 21D is configured by a storage device such as a hard disk drive (HDD) or a solid state drive (SSD), and is stored with various programs and various data.

Figure 2:
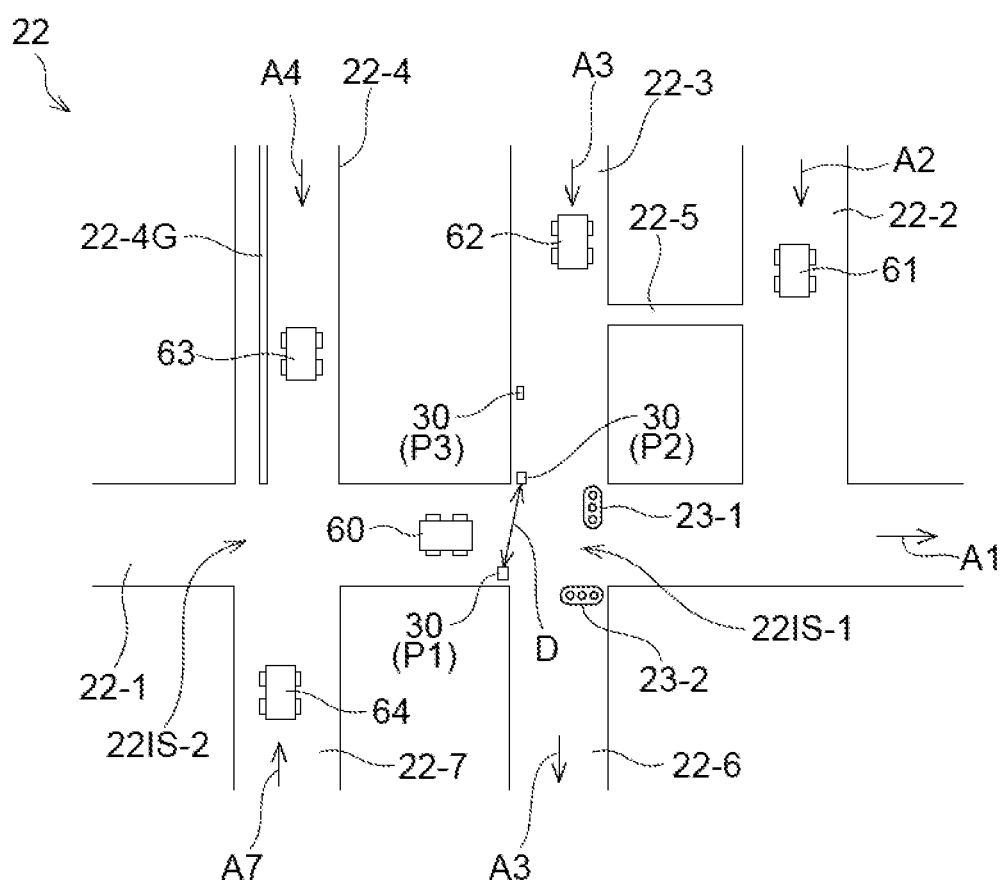
FIG. 2 is a diagram representing a map including roads walkable by a user in possession of a pedestrian attention trigger device.

The map data 22 includes information about an area including an address of a user US (see FIG. 1) who is a member registered on the system 10. Note that although there is only a single person depicted as the user US in FIG. 1, there are plural members registered in the system 10. Information about plural areas is accordingly included in the map data 22. For example, area information such as illustrated in FIG. 2 is included in the map data 22. In the following description a map including the roads of FIG. 2 will be referred to as map data 22.

As illustrated in FIG. 2, an image representing seven roads that extend in straight lines is included in the map data 22. Namely, the map data 22 includes an image representing a first road 22-1, a second road 22-2, a third road 22-3, a fourth road 22-4, a fifth road 22-5, a sixth road 22-6, and a seventh road 22-7.

A vehicle 60 is traveling along arrow A1 on the first road 22-1 extending in a straight line. Note that reference to a vehicle in the present specification includes, for example, a four wheeled vehicle (car), a motorized two wheeled vehicle, and a bicycle. The second road 22-2, the third road 22-3, the fourth road 22-4, the sixth road 22-6, and the seventh road 22-7 are each orthogonal to the first road 22-1 and each have one end connected to the first road 22-1. A vehicle 61 is traveling along arrow A2 on the second road 22-2, a vehicle 62 is traveling along arrows A3 on the third road 22-3 and the sixth road 22-6, a vehicle 63 is traveling along arrow A4 on the fourth road 22-4, and a vehicle 64 is traveling along arrow A7 on the seventh road 22-7. Namely, the first road 22-1, the second road 22-2, the third road 22-3, the fourth road 22-4, the sixth road 22-6, and the seventh road 22-7 are all one-way roads. There is a guard rail 22-4G provided at a side portion of the fourth road 22-4. This means that the number of traffic accidents occurring on the fourth road 22-4 is less than on the first road 22-1, the second road 22-2, the third road 22-3, the sixth road 22-6, and the seventh road 22-7.

Furthermore, a first intersection 22IS-1 is provided at a location where the first road 22-1, the third road 22-3, and the sixth road 22-6 merge. A traffic signal 23-1 and a traffic signal 23-2 are provide at the first intersection 22IS-1. Furthermore, a second intersection 22IS-2 is provided at a location where the first road 22-1, the fourth road 22-4, and the seventh road 22-7 merge. There is no traffic signal provided at the second intersection 22IS-2. This means that more traffic accidents occur at the second intersection 22IS-2 than at the first intersection 22IS-1.

The fifth road 22-5 is orthogonal to the second road 22-2 and the third road 22-3 and the two end portions of the fifth road 22-5 are respectively connected to the second road 22-2 and the third road 22-3. The width of the fifth road 22-5 is much narrower than that of the second road 22-2 and the third road 22-3. This means that in practice vehicles are not able to travel along the fifth road 22-5. Furthermore, in the past a suspicious person was sighted on the fifth road 22-5.

The wireless communication I/F 21E is an interface for performing wireless communication with various equipment. For example, the wireless communication I/F 21E is able to communicate wirelessly with the device 30 and the mobile terminal 40 over a network (for example, the Internet). The wireless communication I/F 21E is able to exchange audio data, described later.

The input/output I/F 21G is an interface for communication with various devices.

Figure 4:
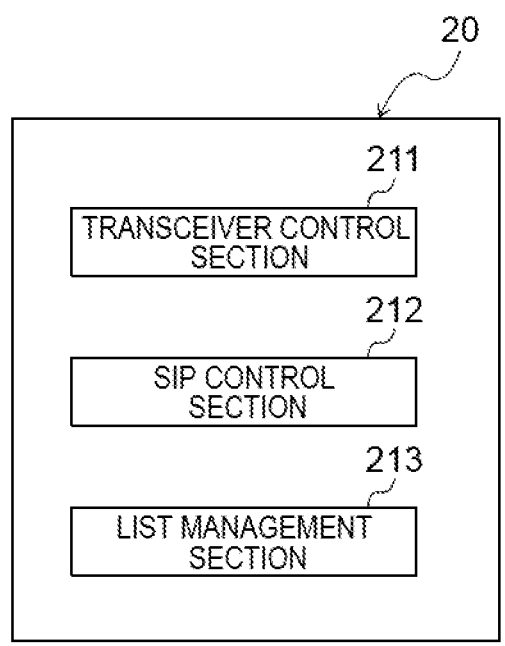
FIG. 4 is a functional block diagram of a management server.

FIG. 4 is a block diagram illustrating an example of a functional configuration of the server 20. The server 20 includes, as functional configuration, a transceiver control section 211, an SIP control section 212, and a list management section 213. These functions are implemented by the CPU 21A reading a program stored on the ROM 21B and executing the program.

The transceiver control section 211 controls the wireless communication I/F 21E. Under control from the transceiver control section 211, the wireless communication I/F 21E is capable of recording data received from outside on the ROM 21B and the storage 21D, and wirelessly transmitting data recorded on the ROM 21B and the storage 21D to outside.

The SIP control section 212 performs voice call control between communication terminals utilizing a Session Initiation Protocol (SIP). Namely, the server 20 includes an SIP server function. Such communication terminals include the device 30 and the mobile terminal 40.

The list management section 213 manages the designated zone list 25 recorded on the ROM 21B (see FIG. 5). The designated zone list 25 includes information representing a user ID, designated zones, and zone classifications.

Examples of designated zones are zones included on the map data 22 as designated by a parent using the mobile terminal 40, as described later. Note that each of the designated zones is actually location information respectively representing each of the designated zones.

The zone classifications are classifications of the designated zones. The zone classifications of the present exemplary embodiment include safety check zones and retreat zones. The safety check zones are zones where the user US should perform a safety check action. For example, a zone where there have been many traffic accidents in the past may be set as a safety check zone. Safety check actions include, for example, a monitoring action to visually monitor vehicles traveling in the surroundings of the user themselves. A retreat zone is a zone that, in cases in which the user has entered such a zone, the user US should execute a retreat action quickly from the zone. For example, a zone where a suspicious person has been sighted in the past may be set as a retreat zone. Note that safety check actions and retreat actions are both included in safety related actions.

In the map data 22, the third road 22-3, the second intersection 22IS-2, and the fifth road 22-5 are set as designated zones. Furthermore, safety check zone is set as the zone classification for the third road 22-3 and the second intersection 22IS-2, and retreat zone is set as the zone classification for the fifth road 22-5.

Furthermore, when update information, described later, has been received from the mobile terminal 40 as described later, the list management section 213 sets (modifies) the designated zones and the zone classifications in the designated zone list 25 based on the update information.

Furthermore, each time a specific period of time has elapsed, the wireless communication I/F 21E controlled by the transceiver control section 211 wirelessly transmits information (location information) related to the designated zones included in the latest designated zone list 25 and information related to the zone classifications to the device 30 having the same user ID as the designated zone list 25. Namely, the wireless communication I/F 21E wirelessly transmits the latest update information to the device 30 each time the specific period of time elapses.

As illustrated in FIG. 1, the device 30 is detachably mounted to a school bag (bookbag) SB worn by the user US, who is a child. When moving between home and school, there is a possibility that the user US will walk along the various roads illustrated in FIG. 2, i.e. the roads 22-1, 22-2, 22-3, 22-4, 22-5, the sixth road 22-6, the seventh road 22-7, and the intersections 22IS-1, 22IS-2.

As illustrated in FIG. 3, the device 30 includes a hardware configuration similar to that of the server 20. Namely, the device 30 includes, as hardware configuration, a CPU 31A (computer), ROM (recording medium) (non-transitory recording medium) 31B, RAM 31C, storage (recording medium) (non-transitory recording medium) 31D, a wireless communication I/F 31E, an input/output I/F 31G, and an internal bus 31Z. The ROM 31B is, for example, installed with plural programs.

Figure 6:
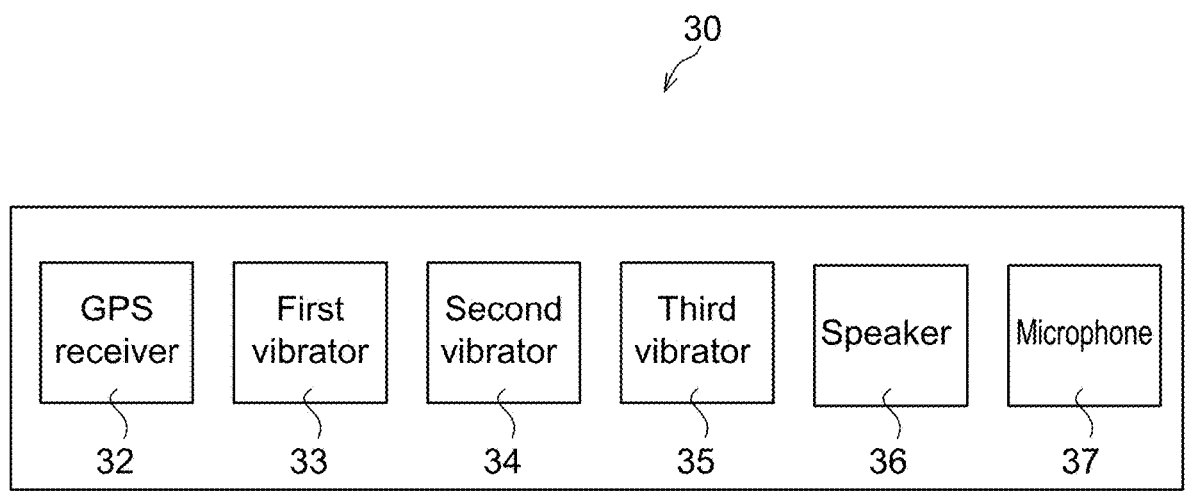
FIG. 6 is a schematic block diagram of a pedestrian attention trigger device.

As illustrated in FIG. 6, the device 30 includes a global positioning system (GPS) receiver 32, a first vibrator (notification device) 33, a second vibrator (notification device) 34, a third vibrator (notification device) 35, a speaker 36, and a microphone 37. The GPS receiver 32 acquires information related to a position of the device 30 (hereafter referred to as "location information") by receiving a GPS signal transmitted from a GPS satellite. The first vibrator 33 executes a vibration action as a first notification action (a safety check notification action) when a safety condition, described later, has been satisfied as a first condition. The second vibrator 34 executes a vibration action as the first notification action (a retreat notification action) when a retreat condition, described later, has been satisfied as the first condition. The third vibrator 35 executes a vibration action as a second notification action when a second condition, described later, has been satisfied. When the first vibrator 33, the second vibrator 34, or the third vibrator 35 vibrates, the vibration is transmitted to the body of the user US through a case (omitted in the drawings) configuring a case of the device 30 and through the school bag SB, enabling the user US to recognize that the device 30 is vibrating. The vibration modes of the first vibrator 33, the second vibrator 34, and the third vibrator 35 are different from each other, and so the user US is able to recognize which is vibrating from out of the first vibrator 33, the second vibrator 34, and the third vibrator 35. The speaker 36 is able to output various sounds. For example, the speaker 36 is able to output a sound based on audio data arriving from the mobile terminal 40 through the server 20. Various audio is input through the microphone 37. For example, a voice spoken by the user US is input to the microphone 37. The GPS receiver 32, the first vibrator 33, the second vibrator 34, the third vibrator 35, the speaker 36, and the microphone 37 are able to communicate with the input/output I/F 31G.

Figure 7:
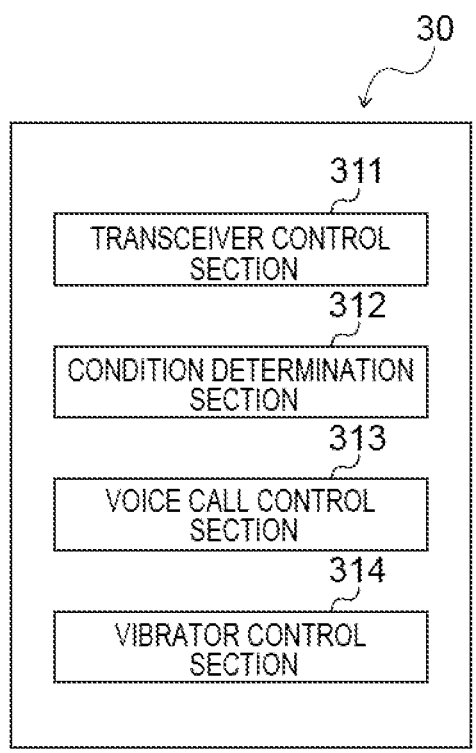
FIG. 7 is a functional block diagram of a pedestrian attention trigger device.

FIG. 7 is a block diagram of an example of a functional configuration of the device 30. The device 30 includes, as functional configuration, a transceiver control section 311, a condition determination section 312, a voice call control section 313, and a vibrator control section (priority control section) 314. These functions are implemented by the CPU 31A reading a program stored on the ROM 31B and executing the program.

The transceiver control section 311 controls the wireless communication I/F 31E. Under control from the transceiver control section 311, the wireless communication I/F 31E is capable of wirelessly communication with the server 20 and the mobile terminal 40 over a network.

The condition determination section 312 computes a distance D between a current position of the device 30 and a designated zone based on the location information received by the GPS receiver 32 and information related to the designated zone received from the server by the wireless communication I/F 31E (update information, described later). For example, when the device 30 is at a position of the position P1 of FIG. 2, the condition determination section 312 computes the distance D between the position P1 and the position P2 based on the location information (update information) of position P2 at one end of the third road 22-3 that is a designated zone, and based on the location information of the position P1.

The condition determination section 312 determines that the safety condition has been satisfied for the designated zone when the distance D between the current position of the device 30 and a designated zone having a zone classification as a safety check zone is a specific first threshold or lower. Furthermore, the condition determination section 312 determines that the retreat condition has been satisfied for the designated zone when the distance D between the current position of the device 30 and a designated zone having a zone classification of a retreat zone is a specific second threshold or lower. The first threshold is, for example, 1.0 m, and the second threshold is, for example, 2.0 m. However, the first threshold and the second threshold may have different magnitudes therefrom. Moreover, the first threshold and the second threshold may have the same magnitude as each other. For example, the first threshold and the second threshold may be 0 m. In the following description a designated zone having a zone classification as a safety check zone will be called a "safety designated zone", and a designated zone having a zone classification as a retreat zone will be called a "retreat designated zone".

The voice call control section 313 controls the speaker 36 and the microphone 37. For example, irrespective of whether or not a voice call application installed in the ROM 31B has been started up, the second condition is satisfied when an incoming telephone call using SIP arrives at the device 30 from a separate communication terminal to the device 30 (for example, from the mobile terminal 40). Moreover, when the second condition has been satisfied, the third vibrator 35 executes a vibration action as the second notification action (incoming call action). Furthermore, when a voice call button (omitted in the drawings) provided to the device 30 is operated after an incoming call has arrived, the third vibrator 35 stops vibrating and a voice call application transitions to an activated state, so as to place the device 30, under control of the voice call control section 313, in a voice call enabled state enabling a voice call to be made with a separate communication terminal. When in the voice call enabled state, the voice spoken by the user US is input to the microphone 37 controlled by the voice call control section 313, and audio data based on this voice is wirelessly transmitted from the wireless communication I/F 31E to the separate communication terminal through the server 20. When in the voice call enabled state, audio data based on a voice spoken by a parent, for example, is transmitted from the mobile terminal 40 to the device 30 (the wireless communication I/F 31E) through the server 20, and the speaker 36 controlled by the voice call control section 313 outputs voice based on this audio data. When a disconnect button (omitted in the drawings) provided to the device 30 in the voice call enabled state is operated, or a disconnect button of the communication terminal that is in a voice call state with the device 30 is operated, the device 30 is placed in a voice call disabled state under control of the voice call control section 313.

The vibrator control section 314 causes the first vibrator 33 to vibrate when the safety condition (first condition) has been satisfied for a safety designated zone. The first vibrator 33 does not vibrate when the safety condition is not satisfied for a safety designated zone. Furthermore, the vibrator control section 314 causes the second vibrator 34 to vibrate when the retreat condition (first condition) has been satisfied for a retreat designated zone. The second vibrator 34 does not vibrate when the retreat condition is not satisfied for a retreat designated zone. Furthermore, the vibrator control section 314 causes the third vibrator 35 to vibrate when the second condition has been satisfied. The third vibrator 35 does not vibrate when the second condition is not satisfied.

When the first condition and the second condition have both been satisfied at the same time, the vibrator control section 314 decides which action to prioritize from out of the action of the first vibrator 33 or the second vibrator 34, and the action of the third vibrator 35.

When both the safety condition and the second condition have been satisfied at the same time for a safety designated zone, the vibrator control section 314 prioritizes the action of the first vibrator 33, over the action of the third vibrator 35 and the action of the speaker 36 and the microphone 37 for voice calls using SIP. Namely, in such circumstances the vibrator control section 314 actuates the first vibrator 33 prior to vibrating the third vibrator 35 and prior to placing the device 30 in a voice call enabled state. In other words, the third vibrator 35 is not vibrated and the device 30 is not placed in a voice call enabled state while the first vibrator 33 is being actuated. When actuation of the first vibrator 33 has ended, the third vibrator 35 is vibrated and the device 30 is placed in a voice call enabled state. Moreover, when the safety condition has been satisfied in a case in which the third vibrator 35 is vibrating or in a case in which the device 30 is in a voice call enabled state, the vibration of the third vibrator 35 is prohibited and the device 30 is placed in a voice call disabled state, and the first vibrator 33 is actuated instead.

When the retreat condition and the second condition have both been satisfied at the same time for a retreat designated zone, the vibrator control section 314 prioritizes actuation of the third vibrator 35 and actuation of the speaker 36 and the microphone 37 for voice call using SIP over actuation of the second vibrator 34. Namely, in such circumstances, the vibrator control section 314 vibrates the third vibrator 35 and the voice call control section 313 places the device 30 in a voice call enabled state prior to actuating the second vibrator 34. In other words, the second vibrator 34 is not actuated in cases in which the third vibrator 35 is vibrating or the device 30 is in a voice call enabled state. The second vibrator 34 is actuated when vibration of the third vibrator 35 has stopped and the device 30 is in a voice call disabled state. When the retreat condition is satisfied while the second vibrator 34 is actuated, the second vibrator 34 is stopped, and the third vibrator 35 is vibrated and the device 30 placed in a voice call enabled state.

The mobile terminal 40 owned by the parent (omitted in the drawings) of the user US includes a display 41, a speaker 42, and a microphone 43, as illustrated in FIG. 1. A touch panel is provided to the display 41. The mobile terminal 40 is, for example, a smartphone or a tablet computer.

As illustrated in FIG. 3, the mobile terminal 40 includes a hardware configuration similar to that of the server 20. Namely, the mobile terminal 40 includes, as hardware configuration, a CPU (computer) 41A, ROM (recording medium) (non-transitory recording medium) 41B, RAM 41C, storage (recording medium) (non-transitory recording medium) 41D, a wireless communication I/F 41E, an input/output I/F 41G, and an internal bus 41Z. The ROM 41B is, for example, installed with a pedestrian attention trigger application. The display 41, the speaker 42, and the microphone 43 are connected to an input/output I/F 41G. The map data 22 and the designated zone list 25 are recorded in the storage 41D.

Figure 8:
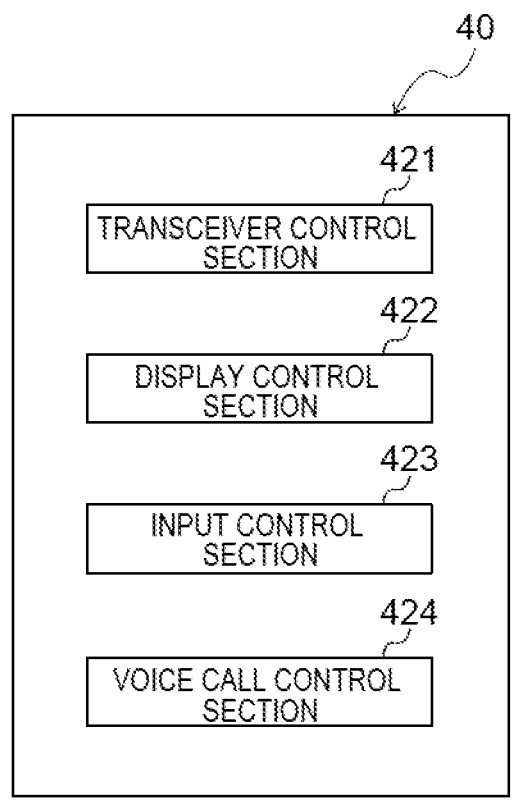
FIG. 8 is a functional block diagram of a mobile terminal.

FIG. 8 is a block diagram illustrating an example of a functional configuration of the mobile terminal 40. The mobile terminal 40 includes, as functional configuration, a transceiver control section 421, a display control section 422, an input control section 423, and a voice call control section 424. These functions are implemented by the CPU 41A reading a program stored on the ROM 41B and executing the program.

The transceiver control section 421 controls the wireless communication I/F 41E. The wireless communication I/F 41E controlled by the transceiver control section 421 is able to wirelessly communicate with the server 20 and the device 30 over a network.

The display control section 422 controls the display 41. Namely, the display control section 422 causes, for example, information received by the wireless communication I/F 41E and information input through the touch panel to be displayed on the display 41. Furthermore, the display control section 422 is also able to display the map data 22 and the designated zone list 25 on the display 41 when the pedestrian attention trigger application has been started up.

The input control section 423 is able to update the designated zone list 25 recorded on the storage 41D based on information input to the mobile terminal 40 through the touch panel. For example, when a parent of the user US looking at the map data 22 and the designated zone list 25 displayed on the display 41 inputs information related to a designated zone and zone classification using the touch panel, the information related to the designated zone and zone classification of the designated zone list 25 is updated by the input control section 423. Furthermore, each time the designated zones and zone classifications are updated, the wireless communication I/F 41E wirelessly transmits, to the server 20, the updated information that is information related to the designated zones and zone classifications updated thereby.

The voice call control section 424 controls the speaker 42 and the microphone 43 in the same manner as the voice call control section 313. Namely, irrespective of whether or not a voice call application installed in the ROM 41B has been started up, when a voice call button (omitted in the drawings) provided to the mobile terminal 40 is operated after an incoming telephone call has arrived at the mobile terminal 40 from a separate communication terminal to the mobile terminal 40 (for example, from the device 30), the voice call application enters an activated state, and, under control of the voice call control section 424, a voice call enabled state is achieved in which the mobile terminal 40 is able to hold a voice call with the separate communication terminal. Moreover, when a disconnect button (omitted in the drawings) provided to the mobile terminal 40 that is in a voice call enabled state is operated, or a disconnect button of the communication terminal that is in a voice call state with the mobile terminal 40 is operated, the mobile terminal 40 is placed in a voice call disabled state under control of the voice call control section 424.

Figure 9:
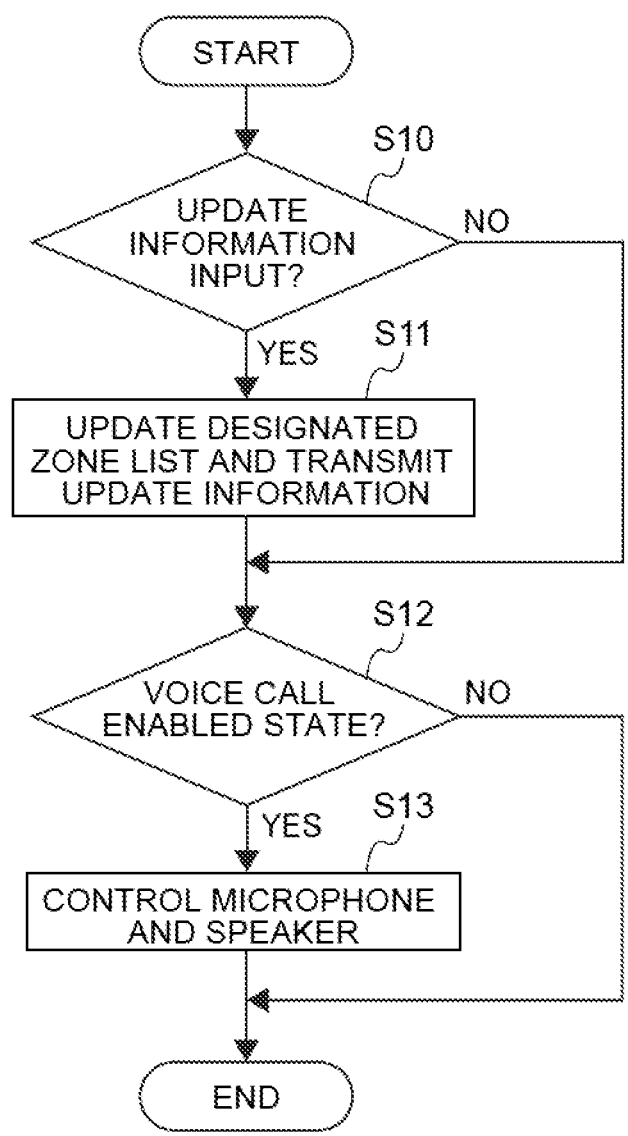
FIG. 9 is a flowchart illustrating processing executed by a mobile terminal.
Figure 10:
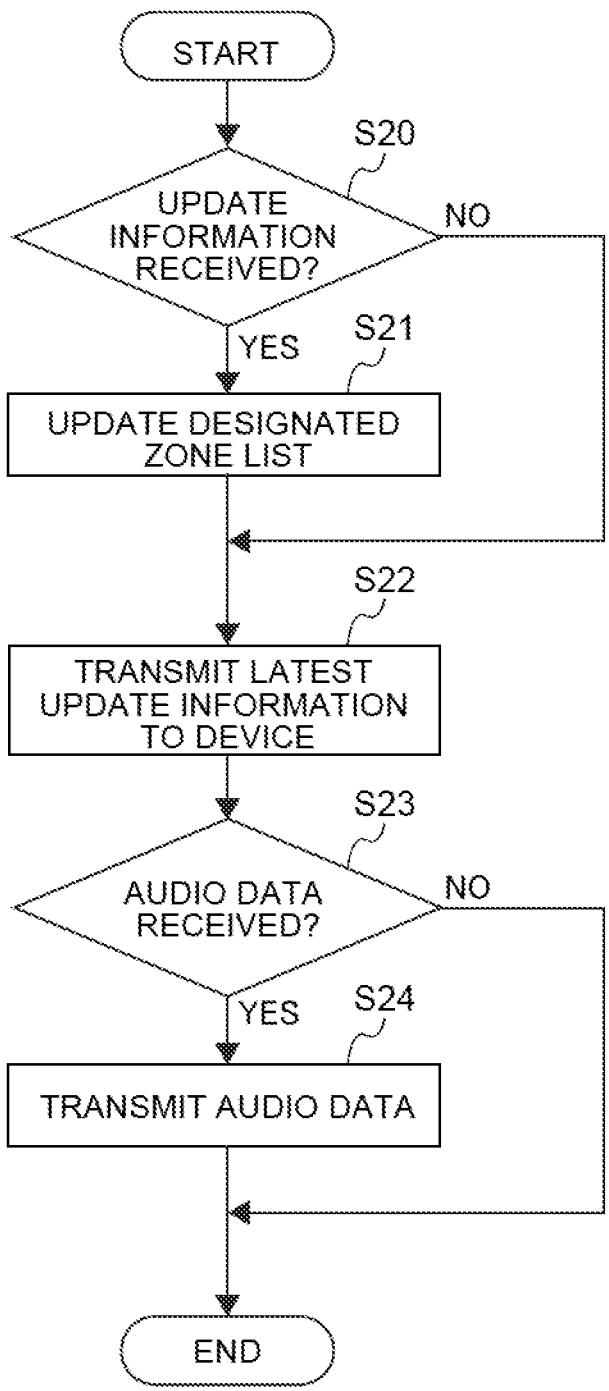
FIG. 10 is a flowchart illustrating processing executed by a management server.
Figure 11:
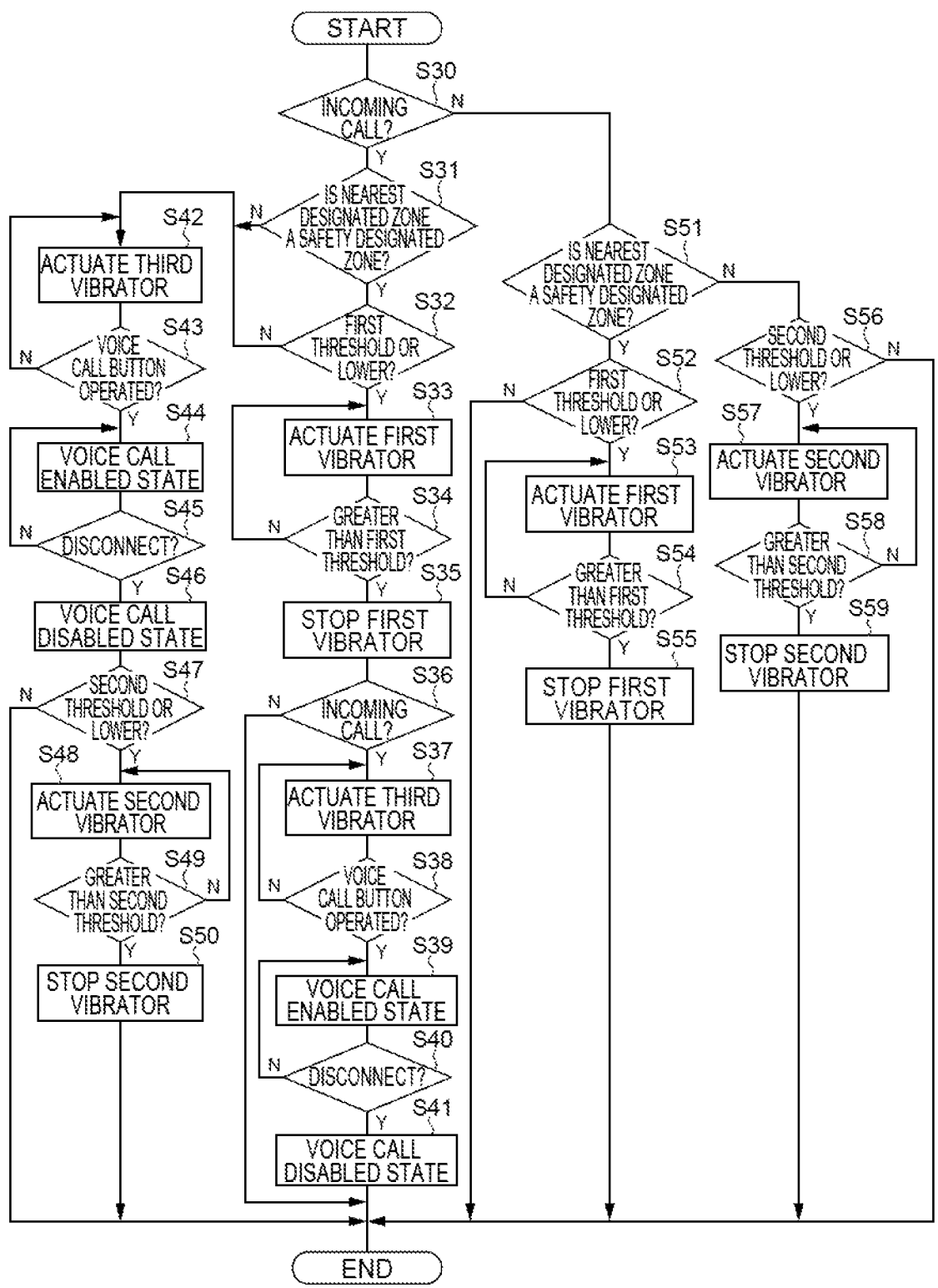
FIG. 11 is a flowchart illustrating processing executed by a pedestrian attention trigger device.

Next, description follows regarding the operation and advantageous effects of the exemplary embodiment, with reference to the flowcharts of FIG. 9 to FIG. 11. The processing of the flowcharts described below is executed by a single CPU, however the processing of each of the flowcharts may be executed by plural CPUs. Note that at a point in time prior to each of the following processing being executed, the content of the designated zone list 25 respectively recorded on both the server 20 and the mobile terminal 40 match each other.

First description follows regarding processing performed by the CPU 41A of the mobile terminal 40, with reference to the flowchart of FIG. 9. The CPU 41A repeats execution of the processing of the flowchart of FIG. 9 each time a specific period of time has elapsed.

First at step S10 ("step" is omitted below), the CPU 41A determines whether or not update information related to the designated zone list 25 has been input using the display 41 (touch panel).

The CPU 41A proceeds to S11 when Yes was determined at S10, updates the designated zone list 25 recorded on the storage 41D, and transmits the update information to the server 20.

The CPU 41A that has finished the processing of S11 proceeds to S12, and determines whether or not the mobile terminal 40 is in a voice call enabled state.

The CPU 41A proceeds to S13 when Yes was determined at S12, and controls the speaker 42 and the microphone 43.

When the processing of S13 has been finished or when No was determined at S12, the CPU 41A ends the processing of the flowchart of FIG. 9 for the time being.

Next, description follows regarding the processing performed by the CPU 21A of the server 20, with reference to the flowchart of FIG. 10. The CPU 21A repeats execution of the processing of the flowchart of FIG. 10 each time a specific period of time has elapsed.

First at S20 the CPU 21A determines whether or not update information has been received from the mobile terminal 40.

The CPU 21A proceeds to S21 when Yes was determined at S20, and updates the designated zone list 25 recorded on the ROM 21B.

When No was determined at S20 or when the processing of S21 has been finished, the CPU 21A proceeds to S22, and the wirelessly transmits the latest update information to the device 30.

The CPU 21A that has finished the processing of S22 proceeds to S23, and determines whether or not audio data has been received from at least one out of the device 30 or the mobile terminal 40.

The CPU 21A proceeds to S24 when Yes was determined at S23, and the received audio data is transmitted to the device 30 or the mobile terminal 40.

When the processing of S24 has been finished or No was determined at S23, the CPU 21A ends the processing of the flowchart of FIG. 10 for the time being.

Description next follows regarding the processing performed by the CPU 31A of the device 30, with reference to the flowchart of FIG. 11. The CPU 31A repeats execution of the processing of the flowchart of FIG. 11 each time a specific period of time has elapsed. Note that the device 30 receives the latest update information from the server 20 each time a specific period of time elapses.

First at S30 the CPU 31A determines whether or not there is an incoming telephone call using SIP.

The CPU 31A proceeds to S31 when Yes was determined at S30, and the CPU 31A determines whether or not the nearest designated zones from the device 30 is a safety designated zone based on the location information of each designated zone (update information) and the location information of the device 30 (location information based on GPS).

The CPU 31A proceeds to S32 when Yes was determined at S31, and the CPU 31A determines whether or not the distance D from the device 30 to the safety designated zone is the first threshold or lower.

The CPU 31A proceeds to S33 when Yes was determined at S32. In such cases the user US (the device 30) is at a position either in a safety designated zone or in the vicinity of a safety designated zone. The first vibrator 33 vibrates under control from the CPU 31A in such a situation. The user US accordingly recognizes that they are themselves either in a zone or in the vicinity of a zone where many traffic accidents have occurred in the past, and that there is a need to execute a monitoring action to visually monitor vehicles. Furthermore, a safety condition is satisfied when the CPU 31A determined Yes at S32.

The CPU 31A that has finished the processing of S33 proceeds to S34, and determines whether or not the distance D is greater than the first threshold. Namely, the CPU 31A determines whether or not the user US has moved away from the safety designated zone.

The CPU 31A that determined Yes at S34 proceeds to S35, and stops the first vibrator 33.

The CPU 31A that has finished the processing of S35 proceeds to S36 and determines whether or not there is an incoming telephone call.

The CPU 31A that determined Yes at S36 proceeds to S37, and vibrates the third vibrator 35.

The CPU 31A that finished the processing of S37 proceeds to S38 and determines whether or not the voice call button has been operated.

The CPU 31A that determined Yes at S38 proceeds to S39, stops the action of the third vibrator 35, and switches the device 30 to the voice call enabled state. The user US and the parent are thereby able to perform a voice call using the device 30 and the mobile terminal 40.

The CPU 31A that has finished the processing of S39 proceeds to S40 and determines whether or not disconnect processing has been executed. The CPU 31A determines Yes at S40 when the disconnect button has been operated on at least one out of the device 30 or the mobile terminal 40.

The CPU 31A that determined Yes at S40 proceeds to S41, and switches the device 30 to the voice call disabled state.

However, the CPU 31A that determined No at S31 or S32 proceeds to S42. Namely, the CPU 31A causes the third vibrator 35 to vibrate irrespective of whether or not the distance D from the device 30 to a retreat designated zone is the second threshold or lower. Note that the retreat condition is satisfied when the distance D is the second threshold or lower.

CPU 31A then executes the processing of S43, S44, S45, and S46. The processing of S42, S43, S44, S45, and S46 is respectively the same as the processing of S37, S38, S39, S40, and S41.

The CPU 31A that has finished the processing of S46 proceeds to S47 and determines whether or not the distance D from the device 30 to a retreat designated zone is the second threshold or lower.

The CPU 31A that determined Yes at S47 proceeds to S48. In such circumstances the user US (the device 30) is at a position either in a retreat designated zone or in the vicinity of a retreat designated zone. The second vibrator 34 is vibrated under control from the CPU 31A in such circumstances. The user US thereby recognizes that a suspicious person has been sighted in the past in the zone they are themselves in, and that there is a need to retreat quickly from this zone. Furthermore, the retreat condition is satisfied when the CPU 31A has determined Yes at S47.

The CPU 31A that has finished the processing of S48 proceeds to S49, and determines whether or not the distance D is greater than the second threshold. Namely, the CPU 31A determines whether or not the user US has moved away from the retreat designated zone.

The CPU 31A that determined Yes at S49 proceeds to S50 and stops the second vibrator 34.

The CPU 31A that determined No at S30 proceeds to S51 and executes the same processing as S31.

The CPU 31A that determined Yes at S51 then executes the processing of S52, S53, S54, and S55. The processing of S52, S53, S54, and S55 is respectively the same as the processing of S32, S33, S34, and S35.

However, the CPU 31A that determined No at S51 executes the processing of S56, S57, S58, and S59. The processing of S56, S57, S58, and S59 is respectively the same as the processing of S47, S48, S49, and S50.

When the processing of S41, S50, S55, or S59 has been finished, or when No was determined at S47, S52, or S56, the CPU 31A ends the processing of the flowchart of FIG. 11 for the time being.

In the exemplary embodiment as described above, the first vibrator 33 vibrates when the user US is at a position either in a safety designated zone or in the vicinity of a safety designated zone. The user US is thereby able to recognize that the zone they themselves are in is a zone where many traffic accidents have occurred in the past, and that there is a need to execute a safety check action. Furthermore, the second vibrator 34 vibrates when the user US is at a position either in a retreat designated zone or in the vicinity of a retreat designated zone. The user US is thereby able to recognize that that the zone they are in is a zone where a suspicious person was sighted in the past, and that there is a need to execute a retreat action.

Moreover, the user US is able to recognize which is vibrating from out of the first vibrator 33 and the second vibrator 34. The user US is thereby able to recognize which action should be executed from out a safety check action or a retreat action.

Furthermore, in the present exemplary embodiment special control is executed in the device 30 when both the first condition and the second condition have been satisfied at the same time.

Namely, the first vibrator 33 is actuated in priority over the third vibrator 35 when both the safety condition, which is a first condition, and the second condition have been satisfied at the same time. When both the safety condition and the second condition have been satisfied at the same time, the user US who has recognized that the vibration occurred in the first vibrator 33 accordingly recognizes the need to execute a safety check action. Namely, there is only a small concern that due to vibration of the third vibrator 35 the attention of the user US might be directed away from the safety check action toward a voice call action using the device 30.

Moreover, when the retreat condition, which is a first condition, and the second condition have both been satisfied at the same time, the third vibrator 35 is actuated in priority over the second vibrator 34 of the device 30. This thereby enables the user US to recognize that there is an incoming telephone call to the device 30. The user US is thereby able to, for example, have a voice call with the parent through the device 30 and the mobile terminal 40. This thereby enables, for example, the parent to convey a necessary message to the user US. This message may, for example, be a message prompting the user US to not pass through the retreat designated zone, or may be message prompting the user US to retreat from the retreat designated zone.

Furthermore, the third vibrator 35 is vibrated in such circumstances, and moreover a voice call enabled state with the user US is adopted. Namely, anyone around the user US will recognize this to be a situation in which the user US is able to hold a voice call with someone through the device 30. This accordingly means that, for example in cases in which the user US is in the fifth road 22-5 that is a retreat designated zone, another person in the fifth road 22-5 would find it difficult to execute any action disadvantageous to the user US.

Furthermore, the second vibrator 34 vibrates when the voice call disconnect processing has been performed. This thereby enables the user US to retreat quickly from the retreat designated zone.

This concludes description of the system 10, the server 20, and the device 30 according to the exemplary embodiment, however various appropriate design modifications may be implemented within a scope not departing from the spirit of the present disclosure.

For example, when both the retreat condition and the second condition have been satisfied at the same time, the second vibrator 34 may be actuated in priority over the third vibrator 35 of the device 30.

The device 30 may be equipped with a mail transceiver function, an alarm function activated at a specific set time, and a function to display various images on the display 41. Note that the mail referred to here encompasses, for example, emails and short messages (SMS). These functions are, for example, implemented by an application installed on the ROM 31B and the CPU 31A. The second notification action of the device 30 in such circumstances may be at least one action of a vibration action executed by the third vibrator 35 when mail is received thereby, an output action of an alarm sound executed by the speaker 36, or an action to display a pop-up image on the display 41.

When the wireless communication I/F 31E has received update information from the server 20 this received update information may be recorded on the ROM 31B or the storage 31D. The frequency of receipt by the device 30 of update information from the server 20 may be lower than the frequency of receipt of the exemplary embodiment. Moreover, the latest designated zone list 25 may be received by the wireless communication I/F 31E from the server 20, and the received designated zone list 25 may be recorded on the ROM 31B or the storage 31D.

The system 10 may lack the server 20. In such circumstances the designated zone list 25 is recorded on the ROM 31B or the storage 31D of the device 30.

The wireless communication I/F 31E of the device 30 may wirelessly transmit the location information of the device 30 to the mobile terminal 40. This thereby enables the parent looking at the display 41 of the mobile terminal 40 to recognize the current position of the user US.

There may be only a single notification device provided in the device 30. For example, a single vibrator (notification device) may vibrate in mutually different modes when the safety condition has been satisfied, when the retreat condition is satisfied, or when the second condition has been satisfied.

Moreover, a configuration may be adopted in which there is only a single notification device provided to the device 30, with this notification device being the speaker 36. For example, the speaker 36 may execute an output action of audio prompting attention of the user US to be triggered as the first notification action when the first condition is determined to have been satisfied. For example, in cases in which the safety condition has been satisfied, the speaker 36 may output an audio message of "Be careful of vehicles around you!" Moreover, in cases in which the retreat condition has been satisfied, the speaker 36 may output an audio message of "Retreat from this zone quickly!" Furthermore, the speaker 36 may output a call sound to call the user US when determined that the second condition has been satisfied.

A configuration may be adopted in which a single vibrator vibrates in mutually different modes when the safety condition has been satisfied or when the retreat condition has been satisfied. Moreover, this vibrator may vibrate in the same mode when the safety condition has been satisfied or when the retreat condition has been satisfied.

The device 30 may be mounted to an object other than a school bag SB. For example, the device 30 may be mounted to a cap worn on the head of the user US, or may be mounted to clothes worn by the user US.

The mobile terminal may be utilized as the device 30. This mobile terminal may, for example, encompass a smartphone.

What is claimed is:

1. A pedestrian attention trigger device configured to move with a user, the pedestrian attention trigger device comprising:
   a notification device that is configured to execute a first notification action in response to determining that a first condition is satisfied, the first condition being satisfied when the user should adopt a safety related action, and that is configured to execute a second notification action in response to determining that a second condition different from the first condition is satisfied; and
   a processor, wherein:
   the processor controls the notification device so as to execute one action of the first notification action or the second notification action in priority over the other action of the first notification action or the second notification action when the first condition and the second condition have both been satisfied at the same time, and so as to execute the other action when a condition that is one of the first condition or the second condition and that corresponds to the one action is no longer satisfied and also a condition that is the other of the first condition or the second condition and that corresponds to the other action is satisfied.

2. The pedestrian attention trigger device of claim 1, wherein:
   the safety related action includes a safety check action;
   the first condition includes a safety condition satisfied when a distance from a zone where the user should execute the safety check action to the pedestrian attention trigger device is a first threshold or lower; and
   the processor controls the notification device so as to execute the first notification action in priority over the second notification action in a case in which the safety condition and the second condition have both been satisfied at the same time as each other.

3. The pedestrian attention trigger device of claim 1, wherein the second notification action includes at least one of an action to notify arrival of an incoming telephone call, an action to notify receipt of a mail, an alarm action executed at a specific time, or a specific action of an application installed on the pedestrian attention trigger device.

4. The pedestrian attention trigger device of claim 1, wherein:
   the safety related action includes a retreat action;
   the first condition includes a retreat condition satisfied when a distance from a zone where the user should execute the retreat action to the pedestrian attention trigger device is a second threshold or lower;
   the second notification action is a telephone incoming call action; and
   the processor controls the notification device such that the second notification action is executed in priority over the first notification action when the retreat condition and the second condition have both been satisfied at the same time as each other.

5. The pedestrian attention trigger device of claim 1, wherein:
   the safety related action includes a safety check action and a retreat action;
   the first condition includes a safety condition satisfied when a distance from a zone where the user should execute the safety check action to the pedestrian attention trigger device is a first threshold or lower, and includes a retreat condition satisfied when a distance from a zone where the user should execute the retreat action to the pedestrian attention trigger device is a second threshold or lower;
   the first notification action includes a safety check notification action and a retreat notification action;
   when the safety condition has been satisfied, the first notification action is the safety check notification action; and
   when the retreat condition has been satisfied, the first notification action is the retreat notification action.

6. A pedestrian attention trigger system comprising:
   a server that wirelessly transmits information to determine whether or not the first condition and the second condition are satisfied to the pedestrian attention trigger device of claim 1; and
   the pedestrian attention trigger device of claim 1.

7. A server configured to wirelessly transmit information to a pedestrian attention trigger device configured to move with a user, the server comprising
   a processor, wherein:
   the pedestrian attention trigger device includes a notification device that is configured to execute a first notification action in response to determining that a first condition is satisfied, the first condition being satisfied when the user should adopt a safety related action, and that is configured to execute a second notification action in response to determining that a second condition different from the first condition is satisfied;
   the notification device is controlled so as to execute one action of the first notification action or the second notification action in priority over the other action of the first notification action or the second notification action when the first condition and the second condition have both been satisfied at the same time, and so as to execute the other action when a condition that is one of the first condition or the second condition and that corresponds to the one action is no longer satisfied and also a condition that is the other of the first condition or the second condition and that corresponds to the other action is satisfied; and the processor is configured to wirelessly transmit information to determine whether or not the first condition and the second condition are satisfied to the pedestrian attention trigger device.

* * * * *